Dec. 7, 1965    KATSUHIKO MURAYAMA    3,221,414
MECHANISM FOR INDICATING THE LEVELING DIRECTION IN
A SURVEYING INSTRUMENT
Filed April 26, 1962

(1)     (2)     (3)

INVENTOR.
KATSUHIKO MURAYAMA
BY
ATTORNEY

United States Patent Office 3,221,414
Patented Dec. 7, 1965

3,221,414
MECHANISM FOR INDICATING THE LEVELING DIRECTION IN A SURVEYING INSTRUMENT
Katsuhiko Murayama, Tokyo, Japan, assignor to Nippon Kogaku K.K., Tokyo, Japan, a corporation of Japan
Filed Apr. 26, 1962, Ser. No. 190,361
Claims priority, application Japan, Nov. 14, 1961, 36/40,770
8 Claims. (Cl. 33—214)

This invention relates to a mechanism for indicating the direction in which a surveying instrument requires adjustment to be level and for quickly and easily so adjusting it.

In one type of conventional surveying instrument, having a leveling tube rigidly attached with the telescope of the instrument, leveling is had by observing, by means of a mirror or prism array, the position of the bubble longitudinally in the tube and then tilting the tube as may be required to centralize the position of the bubble longitudinally within the tube. In the coincident bubble type partial images of the right and left halves of the bubble appear in a field of view, but usually only one of the partial images of the bubble, that is, the right or left half, appears when the telescope of the instrument is not level. In the latter type, leveling is usually obtained by causing the right and left half images of the bubble to coincide by rotating a leveling screw or knob. However, the direction in which the knob must be rotated can not immediately be determined and, consequently, sufficient efficiency for rapid surveying is not obtainable.

This invention provides a simple and efficient device in which the direction in which to rotate the adjusting knob can be determined at a glance, thus removing above-mentioned inconvenience.

A clear concept of the scope and purpose of this invention may be obtained from the following description taken with the drawing in which:

FIGURES 1 and 2 are diagrams showing the principle of the lens system which is the foundation of this invention, with FIGURE 1 being a cross-section through the tube, the liquid, and the bubble in the liquid, at longitudinal regions of the tube at which directional indices are affixed to the tube, and showing the path of the light therethrough reflected from a reflector plate below the bubble tube, while FIGURE 2 is a cross section at other longitudinal regions showing the path of the reflected light from the reflector through the tube and liquid when no bubble is at such other regions;

Figure 5:
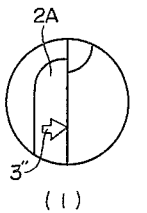
Figure 5:
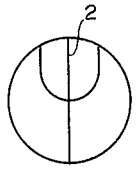
Figure 5:
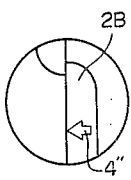

FIGURE 5, (1), (2) and (3) show the fields of view observing the bubble tube of the illustrative embodiment.

Figure 3:
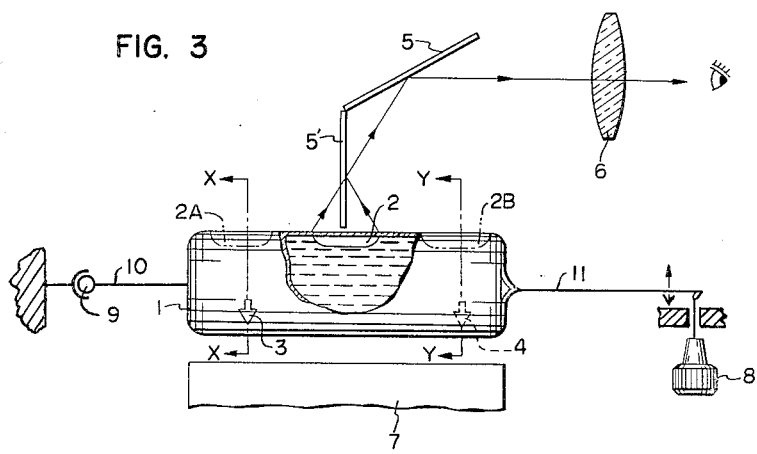
FIGURE 3 shows an elevational, simplified view of an embodiment of this invention.
Figure 4:
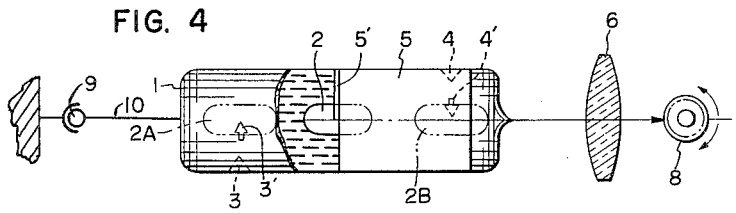
FIGURE 4 shows a plan view of such embodiment.

Referring to FIGURE 3, the illustrative embodiment of the bubble tube level to which the instant invention relates comprises a longitudinal bubble tube 1 supported above an elongated reflecting plate 7 of substantially triangular cross section, the apex of which is centrally aligned with the longitudinal axis of the bubble tube. Tube 1 and plate 7 are both cradled in a longitudinally pivotable frame, not shown but well known in the art, on which there is also supported a reflecting mirror system as below described, the latter cooperating with an ocular 6 mounted in a spatially fixed housing of known type. The reflecting mirror system comprises a vertical mirror 5' supported on the frame above tube 1 at the midlength of the latter and perpendicular thereto and is of a width substantially equal to half the diameter of tube 1, with a lateral side thereof aligned with the principal longitudinal axis of tube 1, and a mirror 5, likewise supported on the frame, positioned adjacent the upper side of mirror 5' at an inclination of 45° thereto, and of a width twice the width of mirror 5', that is, of a width equal to the diameter of tube 1 with its lateral sides aligned with the ends of the horizontal diameter of the tube at its midlength. The frame cradling tube 1 and reflecting plate 7 and mounting mirrors 5 and 5' at each end has an extension, 10 and 11, the outer end of extension 10 being hinged to the housing of the instrument at pivot 9, while the outer end of extension 11 cooperates with a threaded portion of adjusting knob 8, so that tube 1, plate 7 and mirror system 5, 5' can be tilted a limited amount in either the clockwise or counterclockwise direction to centralize bubble 2. Ocular 6 being mounted with the telescope of the instrument, there are thus viewable therein the two halves longitudinally of tube 1 imaged side by side longitudinally therein, the right half of FIGURES 3 and 4 to the right of the center line of the field of view, the left tube half to the left, as shown in FIGURE 5 (1), (2) and (3).

Figure 1:
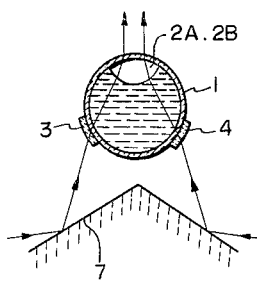
Figure 2:
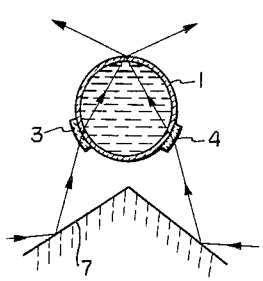

My invention comprises the provision of directional indices 3 and 4 on the bubble tube centered at end regions XX and YY, preferably in the form of arrowheads facing the longitudinal axis of the tube, in the respective longitudinal halves of the tube. When bubble 2 is either to the left of the longitudinal midregion of tube 1, for example at the dotted line position 2A of FIGURES 3 and 4, or to the right of such midregion, for example at position 2B of such figures, the path of the light reflected by plate 7 from sections XX and YY, respectively, is as shown in FIGURE 1 transversely the tube. When, however, the bubble is at some point longitudinally the tube between positions 2A and 2B, for example at position 2 of FIGURES 3 and 4, the path of the so reflected light when so viewed is as shown in FIGURE 2. As viewed longitudinally, half the light reflected through the left longitudinal half of tube 1 is cut off by vertical mirror 5', while the other half (the lower half in FIGURE 4) directly strikes inclined mirror 5, thus producing the left halves longitudinally of the images in the field of view of ocular 6, as shown in FIGURE 5, whereas of all the light reflected through the right longitudinal half of the tube, only the upper half (FIGURE 4) is reflected by vertical mirror 5' to strike inclined mirror 5, thus producing the right longitudial halves of the images in the ocular field of view.

Thus, when the image is as shown in FIGURE 5(1), the left end of the tube is too high, the image 3" of index 3 points to the right to show knob 8 must be rotated counterclockwise to raise the right end of the tube to level the tube. Similarly when image 4" of index 4 appears in the image, the right end of tube 1 is too high, and the direction of rotation of knob 8 is clockwise, as shown in FIGURE 5(3). It follows that when an image of neither arrowhead is in the field of view, as in FIGURE 5(2), no rotation in either direction is required and the tube is level.

As has been stated, indices 3 and 4 are in the shape or arrowheads, are preferably opaque and are attached to the cylindrical wall of the bubble tube on opposite sides thereof at X—X and Y—Y cross sections respectively, with the uppermost base of their triangular heads located at equal distances below the longitudinal axis of the tube. The precise longitudinal location of each is such that when the bubble is at position 2 (FIGURES 3 and 4), the images of the longitudinal halves of the tubes are as shown in FIGURE 5(2) with neither image including an image of the respective index. With the bubble at any other than position 2, an image of the index of one or the other tube halves appears in the image of but one tube half, as shown in FIGURES 5(1) and 5(3). Both these completely opaque or opaque outlined indices may be attached to the reflecting plate 7 at regions aligned with cross sections X—X and Y—Y on the opposite inclined surfaces of plate 7, the precise location of two indexes on said plate 7 being determined in accordance with the same principle as mentioned above.

The direction of the above-mentioned imaged index 3" or 4" is as shown in FIGURE 5(1) and (3), this direction indicating the direction in which the leveling knob 8 is to be rotated so that the operation of coinciding and registering the two longitudinal halves of the bubble image can be carried out according to the direction indicated by the arrow index image 3" or 4" by rotating the knob 8 rapidly in such direction without wondering whether the tube is being moved in the proper direction toward the horizontal. All of the images observed through the ocular 6 are enlarged in size by the lens action which results in clear observation. And, as stated, the bubble tube is so mounted on the surveying instruments, as is prior known, that one end of it is pivotable upwardly or downwardly to a limited extent as shown by the two-headed arrow in FIGURE 3. At one end, the bubble tube has an axial extension from its central region and, at a region remote from the tube per se, the rotatable adjusting knob 8 is interconnected with such extension, in known manner, so that on rotation of the knob the tube is pivoted in journal 9 and can be levelled to exactly the horizontal. When, however, the instrument, and hence the bubble tube, is level no image of any index appears in the imaged registering ends of the tube halves in the ocular, FIGURE 5(1), indicating positively that knob 8 is not to be rotated.

This invention is naturally not limited by the above-mentioned example, but various modifications can be obtained without departing from the scope of the claims.

What I claim is:

1. A mechanism for indicating the direction of adjustment required to position an instrument level horizontally comprising a longitudinally elongated bubble tube, a liquid containing a bubble in the tube, a directional index at each end region of the tube, the tube being pivotable about one end thereof, means at the other end of the tube for adjusting the tube to the horizontal including a member rotatable in opposite directions, and optical means pivotally movable in unison with the bubble tube, and a fixed ocular cooperating with the optical means having a field of view containing in adjacent longitudinal halves the images of the respective longitudinal halves of the tube and their contents, each half of the tube extending from the longitudinal midpoint to a respective end of the tube, the field of view including an image of at least a part of the bubble in the tube and when the tube is inclined from the horizontal one of the half-tube images also includes an image of the directional index in that half-tube visually indicating the direction in which the rotatable element must be rotated to position the tube horizontally.

2. The mechanism according to claim 1 in which each directional index is arrow-head shaped and affixed to the cylindrical surface of the tube below the longitudinal axis of the tube.

3. The mechanism according to claim 2 in which each index is affixed to the lower half region of the cylindrical surface of the tube and aligned longitudinally with the other index with the arrowhead pointing in the same direction.

4. The mechanism according to claim 2 in which each index is affixed to the lower half region of the cylindrical surface of the tube on the opposite sides thereof with the arrowhead pointing in the direction opposite to the arrowhead of the other index.

5. The mechanism according to claim 1 in which each directional index is opaque.

6. The mechanism according to claim 2 in which the optical means is so arranged that the image containing an image of an index shows the latter image with the arrowhead pointing transversely the image in the required direction of rotation of the rotatable member to level the instrument.

7. The mechanism according to claim 5 in which the optical means is so arranged that the half of the image in which an index is imaged shows the image of the index indicating the direction of the rotatable member rotation required to level the instrument.

8. The mechanism according to claim 1 in which the optical means includes an elongated reflector of triangular cross-section below and aligned with the longitudinal axis of the tube, a first mirror mounted above the tube normal thereto having a width equal to half the diameter of the tube and positioned with a lateral side thereof normal to and aligned with the longitudinal axis of the tube at the midlengh of the latter, and a second mirror of a width equal to the diameter of the tube mounted atop the first mirror with its center line aligned with the longitudinal axis of the tube and inclined at 45 degrees to the first mirror.

References Cited by the Examiner

UNITED STATES PATENTS

| 892,353 | 6/1908 | Blair | 33—211 |
| 2,486,954 | 11/1949 | Keuffel | 33—211 |

FOREIGN PATENTS

| 629,518 | 9/1949 | Great Britain. |
| 936,517 | 9/1963 | Great Britain. |

ISAAC LISANN, *Primary Examiner.*

ROBERT L. EVANS, *Examiner.*